US012358019B2

(12) United States Patent
Neubauer et al.

(10) Patent No.: US 12,358,019 B2
(45) Date of Patent: Jul. 15, 2025

(54) ELECTRODYNAMIC VIBRATION EXCITER

(71) Applicant: Continental Engineering Services GmbH, Frankfurt am Main (DE)

(72) Inventors: Philipp Neubauer, Frankfurt am Main (DE); Dimitrios Patsouras, Frankfurt am Main (DE); Johannes Kerkmann, Frankfurt am Main (DE); Karsten Moritz, Frankfurt am Main (DE); Robert Joest, Frankfurt am Main (DE); Stephan Eisele, Frankfurt am Main (DE); Pascal Köhler, Frankfurt am Main (DE); Robert Wick, Frankfurt am Main (DE); Jens Friedrich, Frankfurt am Main (DE)

(73) Assignee: CONTINENTAL ENGINEERING SERVICES GMBH, Frankfurt Am Main (DE)

( * ) Notice: Subject to any disclaimer, the term of this patent is extended or adjusted under 35 U.S.C. 154(b) by 307 days.

(21) Appl. No.: 18/027,710

(22) PCT Filed: Sep. 22, 2021

(86) PCT No.: PCT/DE2021/200126
§ 371 (c)(1),
(2) Date: Mar. 22, 2023

(87) PCT Pub. No.: WO2022/063367
PCT Pub. Date: Mar. 31, 2022

(65) Prior Publication Data
US 2023/0372971 A1 Nov. 23, 2023

(30) Foreign Application Priority Data
Sep. 23, 2020 (DE) ..................... 10 2020 211 946.5

(51) Int. Cl.
*H04R 25/00* (2006.01)
*B06B 1/04* (2006.01)
(Continued)

(52) U.S. Cl.
CPC ............. *B06B 1/045* (2013.01); *H04R 9/025* (2013.01); *H04R 9/06* (2013.01); *H04R 2209/022* (2013.01)

(58) Field of Classification Search
USPC ........................................................... 381/412
See application file for complete search history.

(56) References Cited

U.S. PATENT DOCUMENTS 4,334,127 A 6/1982 Shimada et al.
6,476,702 B1 11/2002 Hartwig et al.
(Continued)

FOREIGN PATENT DOCUMENTS

DE 3024732 A1 1/1981
DE 19839464 A1 3/2000
DE 112018003381 T5 3/2020

OTHER PUBLICATIONS

International Search Report and Written Opinion for International Application No. PCT/DE2021/200126, mailed Dec. 10, 2021, 15 pages.
(Continued)

*Primary Examiner* — Phylesha Dabney
(74) *Attorney, Agent, or Firm* — Buchanan Ingersoll & Rooney PC

(57) ABSTRACT

An actuator, including an electric drive for converting electrical signals into mechanical forces and/or deflections. The drive having at least one coil through which the current of the electrical signal can flow and having at least two magnets which can electromagnetically interact with the coil. The actuator being designed to excite a body which can
(Continued)

be connected to the actuator, in particular a flat body, to vibrate, as a result of which the body can emit acoustic sound. The two magnets are arranged such that they form a substantially straight air gap between them, the coil being arranged in the air gap.

18 Claims, 7 Drawing Sheets

(51) Int. Cl.
*H04R 9/02* (2006.01)
*H04R 9/06* (2006.01)

(56) References Cited

U.S. PATENT DOCUMENTS

| | | | | |
|---|---|---|---|---|
| 11,217,375 | B2 | 1/2022 | Tsuchihashi et al. | |
| 2008/0205686 | A1 | 8/2008 | Tagami et al. | |
| 2008/0247595 | A1 | 10/2008 | Henry | |
| 2011/0164781 | A1 | 7/2011 | Horigome et al. | |
| 2012/0177247 | A1 * | 7/2012 | Li | H04R 9/025 381/412 |
| 2021/0020153 | A1 * | 1/2021 | Reining | H04R 9/025 |
| 2022/0232326 | A1 * | 7/2022 | Heidinger | H04R 9/025 |
| 2024/0203389 | A1 * | 6/2024 | Reining | G10K 9/13 |

OTHER PUBLICATIONS

International Search Report and Written Opinion for International Application No. PCT/DE2021/200126, mailed Dec. 10, 2021, 13 pages (German).
German Search Report for German Application No. 10 2021 210 561.0, dated May 19, 2022 with translation, 17 pages.
Office Action (The First Office Action) issued Jan. 8, 2024, by the State Intellectual Property Office of People's Republic of China in corresponding Chinese Patent Application No. 202190000753.6 with translation (3 pages).

* cited by examiner

ELECTRODYNAMIC VIBRATION EXCITER

CROSS REFERENCE TO RELATED APPLICATIONS

This application is the U.S. National Phase application of PCT International Application No. PCT/DE2021/200126, filed Sep. 22, 2021, which claims priority to German Patent Application No. 10 2020 211 946.5, filed Sep. 23, 2020, the contents of such applications being incorporated by reference herein.

FIELD OF THE INVENTION

The invention relates to an actuator for converting electrical signals into mechanical forces and/or deflections.

SUMMARY OF THE INVENTION

An aspect of the invention is based on an actuator which is particularly inexpensive and/or compact and/or robust and/or particularly well suited to generating acoustic sound.

An actuator is preferably understood to mean an electrodynamic vibration exciter, and preferably likewise vice versa.

An arrangement of the coil in the air gap is preferably understood to mean a complete or partial arrangement of the coil in the air gap in the inoperative state. In particular, the actuator can be designed such that the coil protrudes from the air gap, particularly preferably on two opposite sides, in the inoperative state.

An inoperative state of the actuator and/or the coil is preferably understood to mean a state in which the coil is not deflected and/or in which no electrical signal is present.

A straight air gap is preferably understood to mean an air gap along a plane, in particular with an air gap length that is substantially the same throughout, the air gap length being oriented perpendicularly to this plane and the two magnets in particular in combination with their pole plates, by way of their air gap surface forming the air gap, in particular the surface adjoining the air gap, particularly preferably being oriented substantially parallel to this plane along the air gap.

The air gap length is expediently defined by the distance between the magnets and/or the distance between the pole plates, respectively assigned to/associated with the two magnets, opposite one another.

The actuator is preferably mirror-symmetrical with respect to the plane along the air gap, in particular with the exception of the magnetization of the magnets.

The plane along the air gap is preferably understood to mean a mirror plane and vice versa, or these terms are in particular interchangeable.

The magnets are each preferably in the form of permanent magnets or alternatively preferably in the form of electromagnets.

The vertical direction of the air gap is preferably defined substantially parallel to the deflection direction of the coil in the air gap.

The term “flat body” is preferably understood to mean a body capable of vibrating in an acoustically usable manner and/or a body of which the contour substantially consists of lateral surfaces, that is to say which is in particular not solid or compact, and/or is in the form of a shell-shaped body and/or the thickness thereof, in particular the thickness of the lateral surface thereof, is 2 cm or less, expediently 0.6 cm or less, this thickness limit particularly preferably relating to at least 95% of its outer surface and/or lateral surface.

It is preferred that the two magnets have a mutually opposite/inverse orientation of the magnetization direction, in particular the magnetization direction of the two magnets being substantially parallel to the vertical direction of the air gap and/or substantially parallel to the deflection direction of the coil in the air gap.

The actuator is preferably designed such that a respective pole plate is arranged above and below each magnet, particularly preferably at the poles of the magnets with respect to the vertical direction of the air gap, said pole plates in particular each having the maximum thickness at the air gap and being designed to taper away from the air gap. The design of the pole plates particularly preferably tapers continuously and the pole plate is of flat design here.

It is preferred that at least one, in particular all the, pole plate/s is/are designed such that the outer surface of the pole plate facing away from the magnet, that is to say the outer surface which is arranged opposite the connecting surface or adjoining the magnet, has at least one planar partial surface and/or one plateau, in particular in each case. Here, the partial surface/the plateau is formed in particular substantially perpendicularly to the plane along the air gap, or two perpendiculars to the plane along the air gap substantially span the plane of the partial surface/the plateau.

It is expedient for the outer surface of a pole plate facing away from the magnet or of each pole plate to have a planar partial surface and/or a plateau adjoining the air gap and/or a planar partial surface and/or plateau on the averted side of the air gap. In the event that the outer surface of one or all the pole plates has a planar partial surface and/or a plateau adjoining the air gap and a planar partial surface and/or plateau on the averted side of the air gap, the intermediate region of this outer surface situated in-between is particularly preferably substantially inclined and here designed to be flat and/or designed to correspond to the course of a mathematical function.

The pole plates are expediently arranged in a manner recessed into the air gap in each case by a defined length in relation to the magnets.

The pole plates are preferably formed from ferromagnetic material.

It is preferred that the coil is substantially rectangular and/or substantially rectangular with rounded corners. Here, the coil is in particular at least twice as wide as it is high, high being defined along the vertical direction of the air gap and wide being defined substantially perpendicularly to the air gap length and perpendicularly to the vertical direction of the air gap.

It is expedient for the coil to comprise a coil carrier which is formed from non-ferromagnetic material and in particular has a coefficient of thermal conductivity of at least 20 W/(m K). The coil carrier is expediently formed from electrically non-conductive material.

It is preferred that the coil carrier has a core which is arranged in the interior of the coil, the coil carrier having a respective covering bar above and below the coil, in particular with respect to the vertical direction of the air gap, and covering plates each connected to the covering bars and each being oriented substantially parallel to the plane along the air gap and being arranged on both sides of the coil, so that the covering bars and the covering plates frame the coil in a continuous manner. The covering bars are particularly preferably each designed to be at least as wide as the coil.

It is preferred that the actuator has a spring arrangement, in particular also called a bending spring, which is designed to bias the coil into an inoperative position, the spring arrangement being designed to bias the coil along each possible direction of movement, returning it to the inoperative position.

The spring arrangement expediently has at least one spring unit which is arranged above the magnets and in particular the pole plates in relation to the vertical direction of the air gap and at least one spring unit is arranged below the magnets and in particular the pole plates in relation to the vertical direction of the air gap.

It is expedient for one spring unit or both spring units, in particular in each case, to have two spring elements which run substantially in the direction of the air gap or perpendicularly to the plane along the air gap in an inoperative state, in particular also called transition regions of the bending spring, the spring elements in particular having a curved and/or spiral and/or double-S shape in the inoperative state.

The actuator with the connected body is preferably designed as a bending wave emitter and/or designed such that the actuator excites/can excite the, in particular flat, body to vibrate its body structure, as a result of which the body surrounded by air emits sound waves.

It is preferred that the actuator has at least one connecting element which fixes the two magnets and/or all the pole plates jointly and/or is firmly connected to them, in particular the actuator has two connecting elements on two opposite sides of the actuator, the connecting elements each fixing the two magnets and/or all the pole plates jointly and/or being firmly connected to them. The connecting element/s is/are particularly preferably formed from a non-ferromagnetic material, in particular from plastic or aluminum or copper.

It is preferred that the coil is arranged substantially centrally and/or in the middle in the air gap in the inoperative state.

The surface of a pole plate that is oriented toward the magnet is preferably substantially planar.

It is preferred that the actuator has at least one pole termination plate which is arranged between the coil and one of the two magnets, the pole termination plate being electrically conductive and in particular not being mechanically connected to the coil or the coil carrier. The pole termination plate expediently extends in the vertical direction with respect to the air gap substantially along the magnet or substantially along the magnet and the two pole plates associated with the magnet. The at least one pole termination plate particularly preferably has an electrical conductivity of at least 1 MS/m (megasiemens per meter).

The actuator is preferably designed such that it has a pole termination plate on each of the two magnets, this pole termination plate in particular being arranged on the magnet and pole plates arranged on both sides of the magnet jointly, and the pole termination plate particularly preferably terminating the magnet and the pole plates of the magnet in a manner adjoining the air gap, in particular substantially parallel to the coil or the coil carrier.

It is expedient that the at least one pole termination plate delimits the air gap in the horizontal direction and is oriented along the vertical direction of the air gap, the at least one pole termination plate being mechanically connected to one of the magnets and/or the pole plates of this magnet here, in particular the respective magnet and/or the pole plates associated with it being connected by way of their surfaces respectively adjoining the air gap to the pole termination plate, this connection being formed, for example, by means of an adhesive layer or some other type of connecting layer, such as a soldering layer for example.

It is preferred that the actuator has two pole termination plates which each delimit the air gap on one side in the horizontal direction and are each oriented along the vertical direction of the air gap, the two pole termination plates each being mechanically connected to one of the magnets and/or the pole plates of this magnet here and in particular the pole termination plates, in each case by way of the outer side facing the magnet and its pole plates, being designed to be adapted to the contour of the adjoining outer sides of the magnet and its pole plates.

The spring arrangement and in particular the spring elements are preferably formed from a composite material.

The spring elements are expediently, in particular additionally, coated, for example with one or more plastics with relatively high damping or with relatively massive materials in order to dampen and/or to detune the natural vibration behavior of the spring elements.

The spring arrangement and/or the spring unit and in particular the spring elements are preferably symmetrical or alternatively preferably asymmetrical in order to suppress natural vibrations.

The spring arrangement and/or the spring unit and in particular the spring elements are preferably profiled in order to further improve the rigidity and the vibration properties, the profiling being implemented here in particular by at least one rib and/or at least one bead and/or at least one edge and/or at least one curvature.

BRIEF DESCRIPTION OF THE DRAWINGS

In the drawings, in a schematic illustration.

DETAILED DESCRIPTION OF THE PREFERRED EMBODIMENTS

Figure 1:
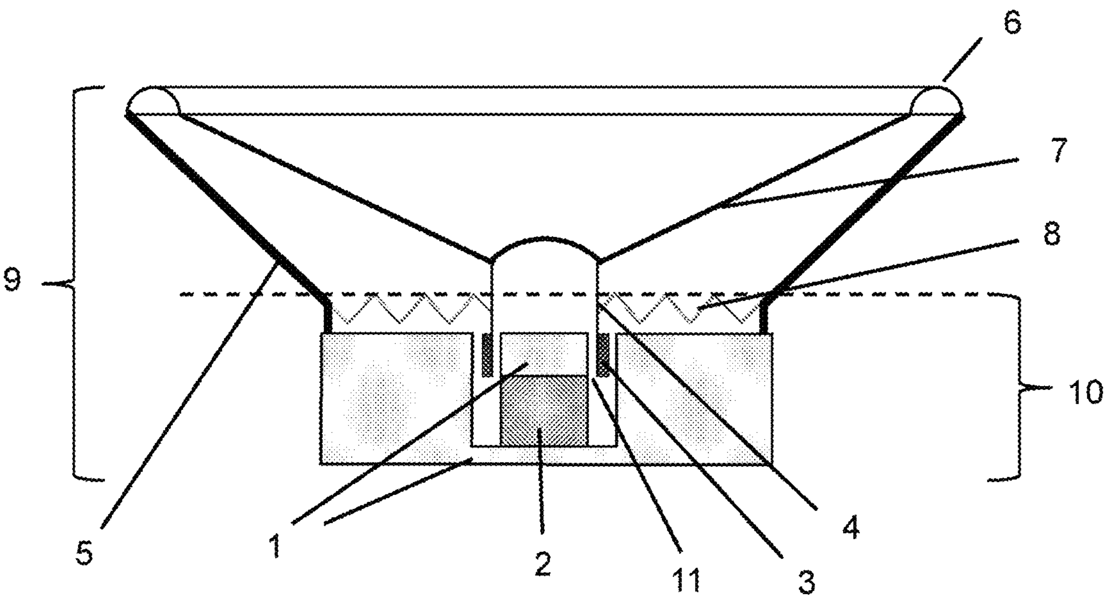
FIG. 1 shows an example of a conventional loudspeaker.

FIG. 1 shows the exemplary structure of a conventional, rotationally symmetrical loudspeaker 9, from which the structure of a conventional vibration exciter 10 can be seen by detaching the diaphragm 7, the coil carrier 4 and the basket 5. A permanent magnet 2 is enclosed by two pole plates composed of ferromagnetic material 1. A circular, current-carrying coil 3 which is only connected to the pole plates via an elastic suspension 8 (usually made of textile fabric) is located in the air gap 11 between the two pole plates. Exciting the coil 3 with an electrical signal creates a force on the coil, this force being introduced into the diaphragm 7 via the coil carrier 4. The vibrating diaphragm 7 is connected to the basket 5 via the mechanically soft bead 6, the basket in turn being firmly connected to the pole plate 1. In previously known electrodynamic vibration exciters 10, the connection to a flat structure is made directly via the coil carrier 4. The basket 5, the bead 6 and the diaphragm 7 are dispensed with in this case.

Figure 2:
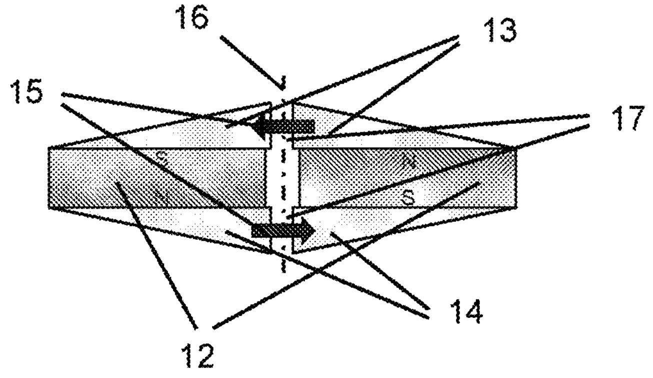
FIGS. 2 to 12 show exemplary embodiments of the actuator or exemplary parts of the actuator.

FIG. 2 shows, by way example, the structure of the magnet system of an electrodynamic vibration exciter or actuator. Two identical magnets 12 are arranged symmetrically with respect to the mirror plane 16, but their magnetic orientation is inverted. An upper pole plate 13 and a lower pole plate 14 are arranged symmetrically with respect to the mirror plane 16 on each of the two magnets. The magnetic flux 15 is consequently oriented in opposite directions in the upper and the lower air gap 17.

Figure 3:
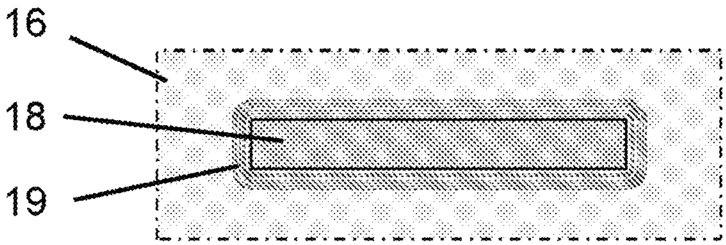

A substantially rectangular coil 19 situated on the mirror plane 16 is illustrated by way of example with reference to FIG. 3. The coil 19 is wound around a core 18 composed of a non-ferromagnetic material.

Figure 4:
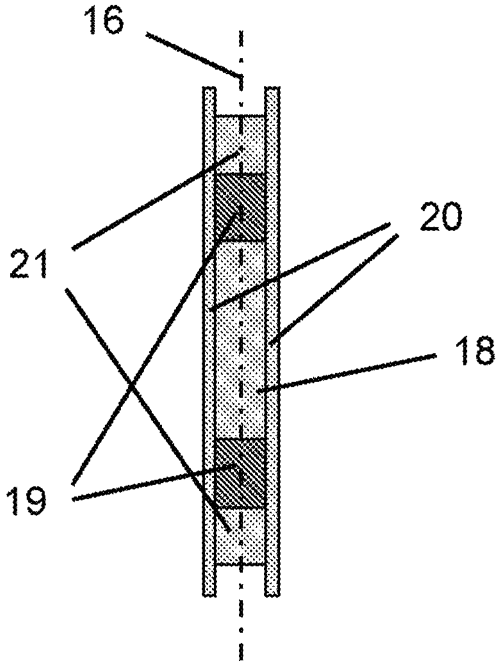

FIG. 4 shows a cross section through a structure, symmetrical with respect to the mirror plane 16, of an exemplary coil 19 with an enclosure. The coil 19 wound around the core 18 is covered laterally by covering plates 20. The coil can optionally be covered by additional covering bars 21 on its top and bottom. The core 18 and the covering plates 20 and covering bars 21 are part of the coil carrier.

Figure 5:
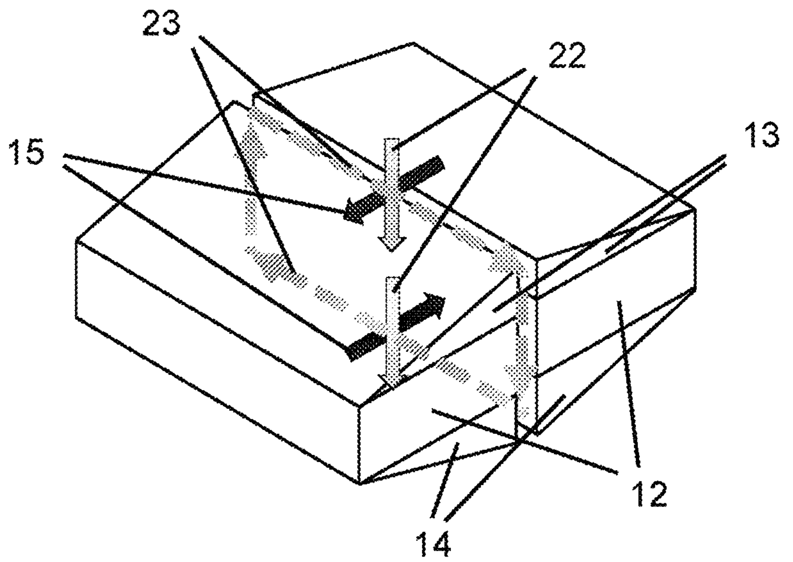

FIG. 5 illustrates, by way of example, the direction of the magnetic flux 15, the electric flux in the coil 23 and the resulting force excitation 22 in the exemplary electrodynamic vibration exciter. The magnetic fluxes 15 between the upper pole plates 13 and the lower pole plates 14 due to the magnets 12 are orthogonal to the electrical fluxes 23, this resulting in a force excitation 22 proportional to the electrical excitation signal of the coil. The coil and thus also its electrical flux 23 lie in the mirror plane of the electrodynamic vibration exciter.

Figure 6:
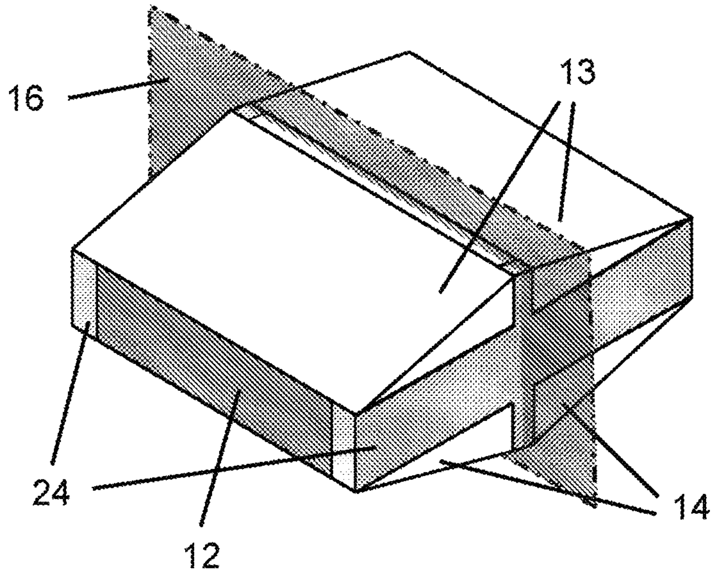

FIG. 6 shows, by way of example, the synchronization of the two mirror halves by means of connecting elements 24. The two mirror halves, each consisting of a magnet 12, an upper pole plate 13 and a lower pole plate 14, are connected to one another by two connecting elements 24, the aim of this being to synchronize their movement. Furthermore, the respective upper pole plates 13 and the respective lower pole plates 14 are positioned at their mutual distance and in their position corresponding to a reflection at the mirror plane 16 by the connecting elements 24. The upper pole plates 13 and the lower pole plates 14 project laterally beyond the magnets 12 by the thickness of the connecting elements 24 in order to completely enclose the connecting elements 24.

Figure 7:
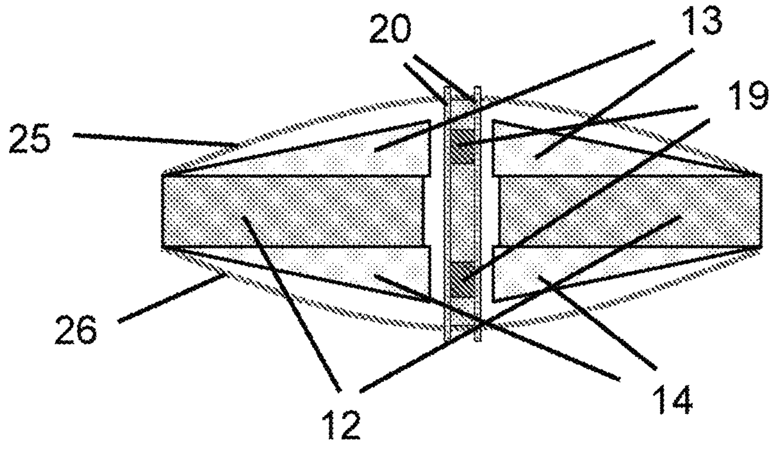

FIG. 7 illustrates an exemplary elastic suspension of the magnets 12 and the pole plates 13, 14 by means of bending springs 25, 26. The bending springs 25, 26 are cut in the region of the outer covering plates of the coil 20, so that the covering plates 20 can be inserted through the bending springs 25, 26, this allowing the coil 19 to be positioned and centered between the pole plates 13, 14 and the magnets 12.

Figure 8:
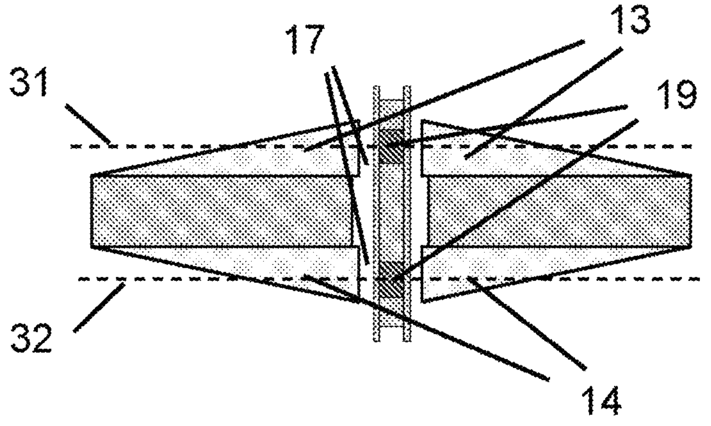

FIG. 8 shows, by way of example, the orientation of the coil 19 between the pole plates 13, 14 by means of orientation planes 31, 32. Imaginary orientation planes 31, 32 are located at the level of half the thickness of the sides of the pole plates 13, 14 facing the air gaps 17. The upper orientation plane 31 and, respectively, lower orientation plane 32 is oriented on the upper pole plates 13 and lower pole plates 14. The coil 19 is preferably oriented in the air gaps 17 such that it intersects the respective orientation plane 31, 32 at half its height. However, it can be positioned with a deliberate displacement in relation to the orientation planes 31, 32 in order to achieve a different characteristic, for example progressive or degressive characteristics, for the electromagnetic excitation.

Figure 9:
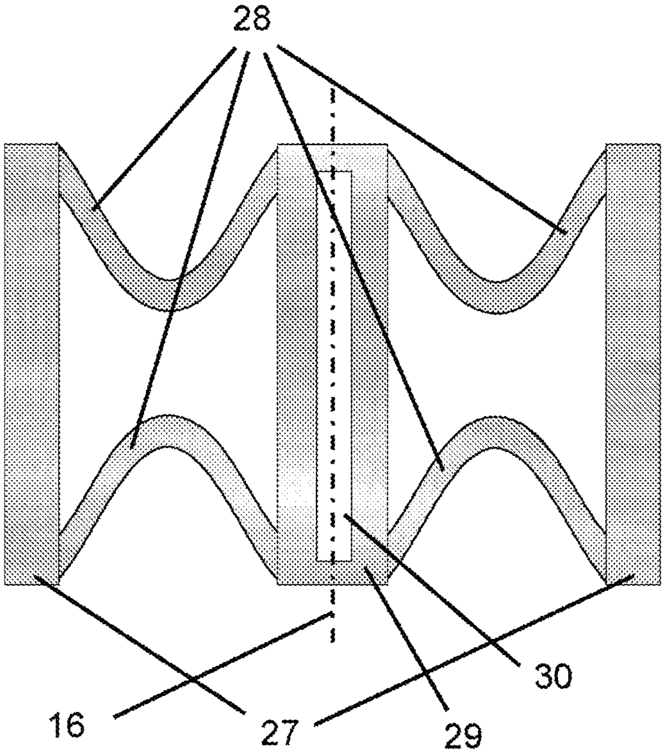

FIG. 9 shows an exemplary plan view of a bending spring. The bending springs are preferably designed symmetrically with respect to the mirror plane 16. The outer regions of the bending spring 27 are connected to the pole plates 13, 14. The middle part of the bending spring 29 has a cutout 30, so that the covering plates of the coil 20 can be inserted through it. The transition regions 28 between the outer regions 27 and the middle part 29 can be shaped as desired, but are preferably constructed with mirror symmetry.

Figure 10:
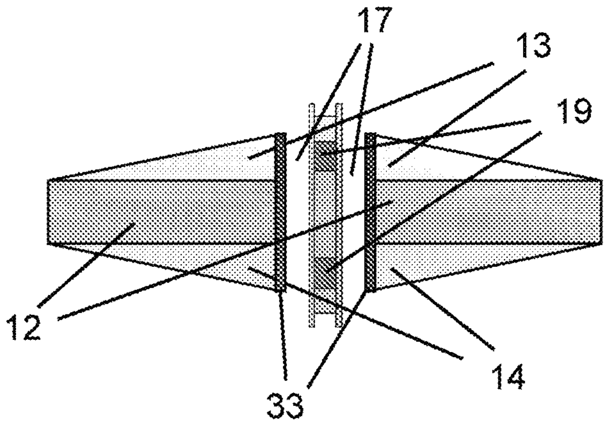

FIG. 10 shows an exemplary actuator in which the coil 19 is arranged between the pole plates 13, 14 in a manner spaced apart by means of an air gap 17 in each case. A respective pole plate 13 and 14 is arranged on and below the magnet 12 in a manner enclosing it on both sides. The magnet 12 and the pair of pole plates 13, 14 each have a pole termination plate 33 composed of electrically conductive material on their surface jointly adjoining the air gap, the pole termination plates each being secured by means of an adhesive layer, not shown, by way of example. The pole termination plate 33 has, by way of example, an electrical conductivity of at least 1 MS/m.

Figure 11:
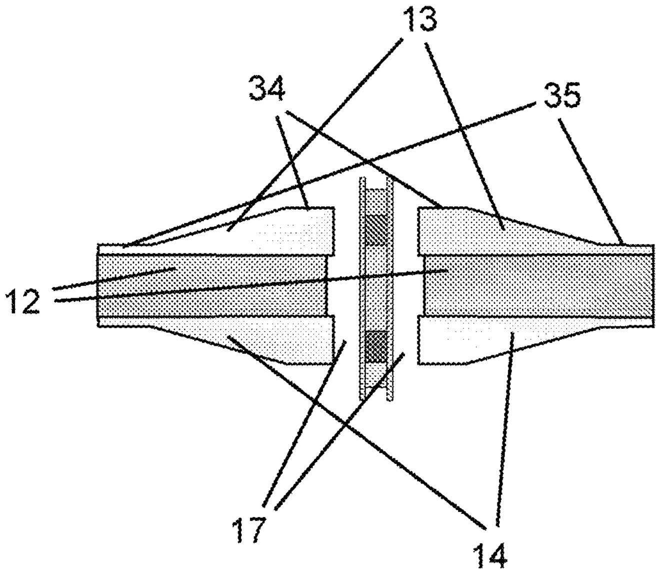

FIG. 11 shows an exemplary actuator in which the pole plates 13, 14 are respectively arranged above and below the two magnets 12 on both sides. Here, the pole plates 13, 14 each have two plateaus 34 and 35 on the outer surface facing away from the magnet 12, the thickness of the pole plate adjoining the air gap in each case and being determined by the plateau 34 and the surface facing the magnet 12 being greater than the thickness of the pole plate on the side opposite the air gap, this thickness being determined between the plateau 35 and the surface facing the magnet 12. The pole plates 13, 14 each have an inclined course, for example a linear change in thickness, between the plateaus 34 and 35.

Figure 12:
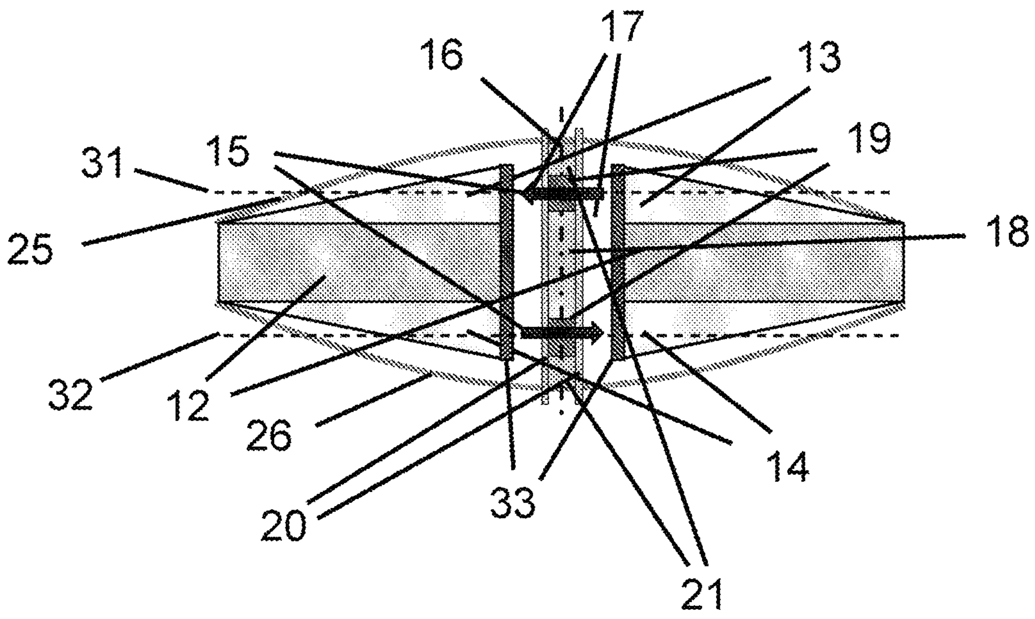

An actuator is illustrated by way of example with reference to FIG. 12. The coil 19 is arranged between the pole plates 13, 14 in a manner spaced apart by means of an air gap 17 in each case. A respective pole plate 13 and 14 is arranged on and below the magnet 12 in a manner enclosing it on both sides. The magnet 12 and the pair of pole plates 13, 14 each have a pole termination plate 33 composed of electrically conductive material on their surface jointly adjoining the air gap 17. The coil 19 is suspended from bending springs 25, 26 and is covered laterally by covering plates 20 and is covered on its top side and bottom side by additional covering bars 21. The coil 19 can vibrate in a manner suspended in mirror plane 16 in this way. Said FIG. 12 also illustrates the orientation of the coil 19 between the pole plates 13, 14 by means of orientation planes 31, 32.

The invention claimed is:

1. An actuator, comprising:

an electric drive for converting electrical signals into mechanical forces and/or deflections, the drive having at least one coil through which the current of the electrical signal can flow and having at least two magnets which can electromagnetically interact with the coil, the actuator being designed to excite a body which can be connected to the actuator, to vibrate, as a result of which the body can emit acoustic sound, wherein the two magnets are arranged such that they form a substantially straight air gap between them, the coil being arranged in said air gap.

2. The actuator as claimed in claim 1, wherein the two magnets have a mutually opposite/inverse orientation of the magnetization direction, the magnetization direction of the two magnets being substantially parallel to the vertical direction of the air gap and/or substantially parallel to the deflection direction of the coil in the air gap.

3. The actuator as claimed in claim 1, wherein the actuator is designed such that a respective pole plate is arranged above and below each magnet with respect to the vertical direction of the air gap, said pole plates each having the maximum thickness at the air gap and being designed to taper away from the air gap.

4. The actuator as claimed in claim 1, wherein at least one, pole plate is designed such that the outer surface of the pole plate facing away from the magnet, such that the outer surface which is arranged opposite the connecting surface or adjoining the magnet, has at least one planar partial surface and/or one plateau, in particular in each case.

5. The actuator as claimed in claim 4, wherein the outer surface of a pole plate facing away from the magnet or of each pole plate has a planar partial surface and/or a plateau adjoining the air gap and/or a planar partial surface and/or plateau on the averted side of the air gap.

6. The actuator as claimed in claim 1, wherein the coil is substantially rectangular and/or substantially rectangular with rounded corners.

7. The actuator as claimed in claim 1, wherein the coil comprises a coil carrier which is formed from non-ferromagnetic material and has a coefficient of thermal conductivity of at least 20 W/(m K).

8. The actuator as claimed in claim 7, wherein the coil carrier has a core which is arranged in the interior of the coil, the coil carrier having a respective covering bar above and below the coil, with respect to the vertical direction of the air gap, and covering plates each connected to the covering bars and each being oriented substantially parallel to the plane along the air gap and being arranged on both sides of the coil, so that the covering bars and the covering plates frame the coil in a continuous manner.

9. The actuator as claimed in claim 1, wherein the actuator has a spring arrangement which is designed to bias the coil into an inoperative position, the spring arrangement being designed to bias the coil along each possible direction of movement, returning it to the inoperative position.

10. The actuator as claimed in claim 9, wherein the spring arrangement has at least one spring unit which is arranged above the magnets and the pole plates in relation to the vertical direction of the air gap and one spring unit is arranged below the magnets and the pole plates in relation to the vertical direction of the air gap.

11. The actuator as claimed in claim 9, wherein one spring unit or both spring units, in each case, has/have two spring elements which run substantially in the direction of the air gap in an inoperative state, the spring elements having a curved and/or spiral and/or double-S shape in the inoperative state.

12. The actuator as claimed in claim 1, wherein the actuator with the connected body is designed as a bending wave emitter and/or is designed such that the actuator excites/can excite the body to vibrate its body structure, as a result of which the body surrounded by air emits sound waves.

13. The actuator as claimed in claim 1, wherein the actuator has at least one connecting element which fixes the two magnets and/or all the pole plates jointly and/or is firmly connected to them, the actuator having two connecting elements on two opposite sides of the actuator, the connecting elements each fixing the two magnets and/or all the pole plates jointly and/or being firmly connected to them.

14. The actuator as claimed in claim 1, wherein the coil is arranged substantially centrally and/or in the middle in the air gap in the inoperative state.

15. The actuator as claimed in claim 1, wherein the actuator has at least one pole termination plate which is arranged between the coil and one of the two magnets, the pole termination plate being electrically conductive and not being mechanically connected to the coil or the coil carrier.

16. The actuator as claimed in claim 1, wherein the at least one pole termination plate delimits the air gap in the horizontal direction and is oriented along the vertical direction of the air gap, the at least one pole termination plate being mechanically connected to one of the magnets and/or the pole plates of this magnet here, the respective magnet and/or the pole plates associated with it being connected by way of their surfaces respectively adjoining the air gap to the pole termination plate.

17. The actuator as claimed in claim 1, wherein the actuator has two pole termination plates which each delimit the air gap on one side in the horizontal direction and are each oriented along the vertical direction of the air gap, the two pole termination plates each being mechanically connected to one of the magnets and/or the pole plates of this magnet here and the pole termination plates, in each case by way of the outer side facing the magnet and its pole plates, being designed to be adapted to the contour of the adjoining outer sides of the magnet and its pole plates.

18. The actuator as claimed in claim 1, wherein the body is a flat body.

* * * * *